United States Patent [19]

Kim

[11] 4,370,260

[45] Jan. 25, 1983

[54] METHOD OF PREPARING SUPPORTED PLATINUM GROUP METAL CATALYSTS

[75] Inventor: Gwan Kim, Columbia, Md.

[73] Assignee: W. R. Grace & Co., New York, N.Y.

[21] Appl. No.: 255,967

[22] Filed: Apr. 20, 1981

[51] Int. Cl.³ .......................... B01J 27/02; B01J 27/24
[52] U.S. Cl. ..................................... 252/438; 252/439; 252/462; 252/466 PT; 252/472; 423/213.5
[58] Field of Search ................. 252/438, 439, 466 PT, 252/472; 423/213.5

[56] References Cited

U.S. PATENT DOCUMENTS 3,932,309  1/1976  Graham et al. ..................... 252/439
4,154,812  5/1979  Sanchez et al. ..................... 423/626

Primary Examiner—W. J. Shine
Attorney, Agent, or Firm—Mark T. Collins; Edward J. Cabic

[57] ABSTRACT

A refractory inorganic oxide support is impregnated with a mixture which contains a platinum sulfito complex solution, a palladium sulfito complex solution, and a rhodium nitrate solution and has a pH of from about 1 to about 5. Activation of the impregnated support provides a three-way automotive exhaust catalyst having high efficiency and improved durability by a single impregnation method.

20 Claims, No Drawings

METHOD OF PREPARING SUPPORTED PLATINUM GROUP METAL CATALYSTS

The invention relates to supported platinum group metal compositions that are especially useful as automotive exhaust gas catalysts and to methods for preparing them.

A common deficiency of supported platinum group metal catalyst compositions is a significant decrease in activity due to hydrothermal sintering and poisoning when they are used for long periods of time at elevated temperatures in a variety of chemical processes. The high temperatures cause metal migration and interaction with each other and the support and loss of surface area and strength so that increased attrition, reactant channeling, and substantial loss of catalytic activity occur. This problem is particularly severe when the catalyst is employed in a moving motor vehicle where exhaust temperatures are frequently above 500° C. with excursions to 950° C. or higher. Further, an automotive exhaust catalyst is subjected to considerable mechanical vibration, relatively low temperatures during engine start-up, and a variety of relatively oxidizing and reducing atmospheres during engine idling, acceleration, and deceleration. Catalysts containing multiple platinum group metals and used for three-way conversion of carbon monoxide, hydrocarbons, and nitrogen oxides in automotive exhaust gases must be capable of both oxidation and reduction at low temperatures after engine start-up and maintain these activities under a variety of modes of engine operation and consequently of exhaust gas compositions, flow rates, and temperatures for economically feasible periods of time.

The resistance to poisoning and sintering and thus the sustained activity of an automotive exhaust catalyst are especially dependent upon the location and distribution of the catalytic ingredient on the support. Placement of platinum group metals on the support in the manner that achieves the best overall performance over the life of the catalyst is particularly significant since only small amounts of the metals can be economically used. Many competing phenomena are involved in the positioning of the platinum group metals. Impregnating the desired amount of metal over the greatest possible area by deep impregnation into the support provides maximum dispersion and catalytic surface area. Increased dispersion reduces the occurrence of crystallite growth of the catalytic metals and deeper impregnation may delay poisoning because the penetrating poisons may not reach the deeper catalytic layers until the required catalyst lifetime is obtained. However, since contact times are short in an automotive exhaust system and the catalysts employed have relatively small pore diameters, reaction rates may be diffusion controlled and the impregnation depth should not exceed the distance that reactants can effectively diffuse into the pore structure of the support. Metals located close to the exterior surface of the support are most effective in initial conversion but are also most susceptible to poisoning. A balance of impregnated surface area and dispersion with accessibility and poison resistance should be achieved to formulate an active and durable catalyst. Thus, the relative conversion efficiency as well as the relative susceptibility to poisoning of each metal must be considered in distributing the metals in the support.

Three way automotive exhaust gas catalysts generally contain platinum, palladium, and rhodium impregnated on a support. The distribution of each metal in the catalyst and thus its activity are effected by the other metals in the impregnation solution and thus at least two impregnations have been generally used to provide the metal dispersion and distribution necessary for high three-way conversion efficiencies.

In accordance with this invention, a refractory inorganic oxide support is impregnated with a mixture of a solution of platinum sulfito complex solution, a palladium sulfito complex solution, and a rhodium nitrate solution and the impregnated support is activated. The mixture has a pH of from about 1 to about 5. Preferably, the mixture also includes a rhodium sulfito complex solution. The single impregnation method of the present invention avoids the multiple drying steps of prior methods and provides a three-way automotive exhaust catalyst of unexpectedly superior initial and sustained activity at lower rhodium contents.

A refractory inorganic support is employed in the present invention. These oxides have a high total pore volume and surface area. Generally, the surface area of the refractory oxide is at least about 50 square meters per gram, preferably from about 80 to about 300 square meters per gram, and the total pore volume is at least about 0.4 cubic centimeters per gram, preferably from about 0.5 to about 2.0 cubic centimeters per gram. The surface areas throughout this specification are determined by the nitrogen BET method and the total pore volumes are determined by adding water to a sample to the point where incipient wetness just occurs.

Generally, the refractory oxide is composed predominantly of oxides of one or more metals of Groups II, III, and IV having atomic numbers not exceeding 40. Suitable porous refractory inorganic oxides can be prepared by dehydrating, preferably substantially completely, the hydrate form of the oxide by calcination generally at temperatures of about 400° to about 1200° C. for periods of from about $\frac{1}{2}$ to about 6 hours. The preferred refractory oxide is a transitional alumina, such as chi, rho, kappa, gamma, delta, eta, and theta alumina. Other suitable oxides include, for example, beryllia, zirconia, magnesia, and mixtures of metal oxides such as magnesia-alumina, silica-alumina, boria-alumina, and the like.

The support is preferably formed particles having various shapes such as spherical, spheroidal, cylindrical, polylobal, figure eight, cloverleaf, dumbbell, and the like. The support may be shaped by granulating, pelleting, extruding, molding, gelation, and other known methods. Spheroidal particles are preferred since they permit more uniform packing of the catalyst bed and are less subject to attrition than particles of other shapes. Additionally, the calcined support can be coated on a relatively catalytically inert substrate, such as a monolithic structure, and the platinum group metals then deposited. Generally, the support coating comprises from about 5 to about 20 percent based upon the weight of the substrate and the coating.

The refractory inorganic oxide may contain one or more other metal oxides that enhance the thermal stability of the support and/or the activity of the catalyst. Suitable metal oxides include one or more rare earth metal oxides and alkaline earth metal oxides and may generally comprise from about 1 to about 25 percent based upon the total weight of the support. Ceria-alumina supports containing from about 2 to about 15 percent ceria expressed as $CeO_2$ are especially preferred to provide enhanced thermal stability, dispersion of the platinum group metal, and catalytic activity. The rare earth or alkaline earth oxide-containing support may be prepared, for example, by impregnating the support with an aqueous solution of a thermally decomposable metal compound, such as the nitrate or acetate, in an amount sufficient to provide the desired oxide content. The impregnated support may be dried to a temperature of from about 90° to about 225° C. for about 2 to about 20 hours and calcined at a temperature of at least about 700° C. for at least about 1 hour.

To provide a catalyst composition in accordance with the present invention, the support is impregnated with a mixture of a platinum sulfito complex solution, a palladium sulfito complex solution, and a rhodium nitrate solution. Preferably, the mixture further comprises a rhodium sulfito complex solution.

Typically, the impregnation is performed by spraying the support with the mixture or by immersing the support in the mixture so that the desired level of pore saturation is achieved. The quantity of the mixture impregnated and its concentration of each platinum group metal are selected to provide a catalyst composition containing catalytically effective amounts of each platinum group metal and the balance of the catalyst composition is the support. Generally, the support may be impregnated with the mixture in amounts sufficient to provide a catalyst composition having a total platinum group metal content, based upon the total weight of the catalyst composition, from about 0.005 to about 1 weight percent and preferably from about 0.03 to about 0.30 weight percent to be both economically and technically feasible. The supports may be impregnated with the mixture in amounts sufficient to provide a catalyst composition that comprises from about 0.02 to about 0.2 weight percent platinum, from about 0.005 to about 0.2 weight percent palladium, and from about 0.001 to about 0.05 weight percent rhodium, based upon the total weight of the catalyst composition.

The sulfito complexes of platinum and palladium generally contain from 1 to 4 sulfito groups per atom of platinum group metal. The rhodium sulfito complexes generally contain from about 1 to about 3 sulfito groups per atom of rhodium. The number of sulfito groups and other ligands, such as chloride and hydroxyl ions, in the complexes varies with the sulfiting agent concentration, temperature, and reaction time employed in their preparation. Cations, such as hydrogen ions or ammonium ions, may be present in the complex or in the solution with the platinum group metal sulfito complex anions. Suitable complexes include ammonium and acid disulfito, tetrasulfito, and disulfito-diammine complexes of platinum or palladium. These complexes have the empirical formulas $M_2(X)(SO_3)_2$, $M_6(X)(SO_3)_4$, and $M_2(X)(SO_3)_2(NH_3)_2$, wherein M is $NH_4^+$ or $H^+$ and X is platinum or palladium. For example, these complexes include $(NH_4)_6Pt(SO_3)_4$, $(NH_4)_2Pt(SO_3)_2$, $(NH_4)_2Pt(SO_3)_2(NH_3)_2$, $H_6Pt(SO_3)_4$, $H_2Pt(SO_3)_2$, $H_2Pt(SO_3)_2(NH_3)_2$, $(NH_4)_6Pd(SO_3)_4$, $(NH_4)_2Pd(SO_3)_2$, $(NH_4)_2Pd(SO_3)_2(NH_3)_2$, $H_6Pd(SO_3)_4$, $H_2Pd(SO_3)_2$, and $H_2Pd(SO_3)_2(NH_3)_2$. Suitable rhodium sulfito complexes include acid trisulfito and ammonium and acid trisulfito-triammine complexes. These complexes have the empirical formulas $(H)_3(Rh)(SO_3)_3$, $(NH_4)_3(Rh)(SO_3)_3(NH_3)_n$, and $(H)_3(Rh)(SO_3)_3(NH_3)_n$, wherein n is 1, 2, or 3. For example, the complexes include $(NH_4)_3Rh(SO_3)_3(NH_3)_3$, $H_3Rh(SO_3)_3(NH_3)_3$, and $H_3Rh(SO_3)_3$. Of course, the number of the sulfito and other ligands in the complex will vary from these formulas in an in-situ solution.

Generally, the sulfito complexes are prepared by treating a platinum group metal compound in an aqueous medium with a sulfiting agent comprising ammonium bisulfite or sulfurous acid. Generally, the sulfiting agent is reacted with the platinum group metal compound in an amount of from about 1 to about 6, preferably from about 3 to about 5, moles of $SO_2$ or $HSO_3^-$ per gram atom of platinum group metal and the reaction may be conducted at a temperature of from about 20 to about 100° C. for at least about 15 minutes. The acid complexes may be conveniently prepared at about 40° to about 80° C. in about ½ to about 2 hours or at about 20° to about 30° C. in about 16 to about 24 hours. The acid complexes may also be prepared by cation exchange of an ammonium sulfito complex with an acid resin. The resin is employed in an amount sufficient to replace the ammonium ions in the complex. The ammine complexes may be prepared by treating an ammonium or acid sulfito complex with ammonium hydroxide, an ammonium salt, or a mixture thereof. The stoichiometric amount sufficient to provide the desired number of ammine groups may be used.

For example, the platinum and palladium ammonium and acid sulfito complexes may be prepared in accordance with the procedures described in U.S. Pat. No. 3,932,309 to Graham et al. In this patent, solutions of the ammonium salts of platinum and palladium sulfito complexes are prepared by reacting ammonium bisulfite with chloroplatinic acid and palladium nitrate respectively. Palladium chloride may also be used. The solution of the resulting in-situ complex or a solution prepared by isolating and redissolving the complex may be used to impregnate the support. The in-situ acid form of platinum or palladium sulfito complexes can be prepared by reacting an aqueous solution of the platinum or palladium compound with sulfur dioxide. Sulfurous acid may also be used.

Solutions of the ammonium and acid sulfito complexes of rhodium may be prepared by the addition of rhodium chloride to ammonium bisulfite or sulfurous acid respectively in an aqueous medium. An acid complex of any of the platinum group metals can also be prepared by cation exchange of the ammonium complexes. If desired, the complexes may be precipitated with methyl or ethyl alcohol and isolated.

The ammonium sulfito ammine complexes of platinum and palladium can be prepared by adding ammonium hydroxide, an ammonium salt, such as ammonium carbonate, or mixtures thereof to the corresponding ammonium sulfito complexes in the stoichiometric amount to form the desired complex. The ammonium rhodium ammine complex may be prepared by adding rhodium chloride solution to ammonium bisulfite solution. The amine complexes can be isolated by precipitation with methyl or ethyl alcohol. The acid ammine complexes may be prepared by cation exchange of the ammonium ammine complexes.

The palladium sulfito complex solution is generally employed in the mixture in an amount sufficient to provide a platinum to palladium weight ratio in the mixture of from about 10 to 1 to about 1 to 10 and preferably of from about 4 to 1 to about 1 to 3. The penetration of the acid complex of palladium or of the other platinum group metals may be increased by including a penetration aid in the solution. The penetration aid is a dibasic carboxylic acid containing from about 2 to about 8 carbon atoms or an ammonium salt thereof. Suitable penetration aids include the organic acids described in U.S. Pat. No. 3,259,589 to Michalko, herein incorporated by reference, and ammonium salts thereof. The penetration aid is preferably selected from the group consisting of dibasic acids having the formula

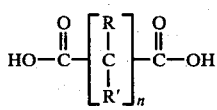

wherein R is selected from hydrogen, hydroxyl and alkyl groups; R' is selected from hydrogen, alkyl and carboxyl groups; and n is within the range of 0 to 6; and ammonium salts thereof. Suitable organic acids include oxalic acid, malonic acid, succinic acid, glutaric acid, adipic acid, pimelic acid, suberic acid, malic acid, tartaric acid, citric acid, 2-methyl succinic acid, 2,3 diethylsuccinic acid, and 2,2 dimethyl succinic acid. Dibasic ammonium citrate is especially preferred as the penetration aid. The amount of penetration aid employed is based on the amount of the support. The penetration aid is incorporated in the impregnation solution in an amount of from about 0.1 to about 1.5 percent by weight of the support or of from about 1 to about 5 millimoles per liter of the support.

The platinum sulfito complex solution is generally employed in the mixture in an amount sufficient to provide a platinum to rhodium weight ratio in the mixture of from about 20 to 1 to about 3 to 1 and preferably of from about 12 to 1 to about 5 to 1. Preferably, a rhodium nitrate solution and a rhodium sulfito complex solution are used in the mixture. Generally, the concentrations of each rhodium-containing solution and their relative amounts in the mixture are sufficient to provide from about 30 to about 70 weight percent of the total rhodium in the mixture from each solution. Preferably, from about 40 to about 60 weight percent of the rhodium in the mixture is provided by each solution. The use of sufficient amounts of each solution to provide a weight ratio in the mixture of about 1 to 1 of rhodium from each complex is especially preferred.

The impregnation mixture has a pH of from about 1 to about 5, preferably of from about 1 to 4, and especially of from about 1.2 to about 2 to avoid excessive accumulation at the exterior surface and excessive penetration into the interior of the platinum group metals. An ammonium hydroxide solution is conveniently added to the mixture to provide a pH in this range. The pH of the platinum sulfito complex solution also may be adjusted to the same pH range prior to addition of the other solutions to provide a mixture having a pH in this range.

After completion of the addition of the platinum group metals, the catalyst composition may be dried at a temperature of from about 90° to about 225° C. for about 2 to about 20 hours. Drying serves to remove the impregnation medium and deposit the platinum group metal compounds on the support. If desired, removal of the impregnation medium may be carried out in a drying step or as a part of the activation procedure. The composition may be activated by heating under conditions which provide a composition having characteristics that promote the desired reaction. This activation stabilizes the catalyst so that, during the initial stages of use, its activity is not materially altered. The temperature of this activation is low enough to prevent substantial sintering of the catalyst which would cause substantial occlusion of the platinum group metal component. Thus, the catalyst may be activated by heating in a reducing atmosphere, such as a mixture of nitrogen and hydrogen, at a temperature of from about 200° to about 800° C., preferably from about 350° to about 700° C., for about ½ to about 4 hours, or simply in air at temperatures of from about 250° to about 500° C. for about ½ to about 4 hours. Activation in a reducing atmosphere is preferred since it improves hydrocarbon and carbon monoxide conversions.

The catalyst compositions produced in the method of the present invention comprise platinum, palladium, and rhodium deposited on a refractory inorganic support. The method provides a distribution of each metal that balances the susceptibility of each metal to poisoning and the degree to which its activity is dependent on reactant diffusion into the pores. The metal distributions disclosed throughout this specification were determined by the chloroform attrition method. In this method, 100 grams of catalyst are agitated in chloroform for a specified length of time dependent on the amount of catalyst surface to be attrited. The attrited material is separated from the unattrited remainder, dried, and weighed. The attrited material and the remainder on completion of the attritions are analyzed for their respective contents of platinum, palladium and rhodium by X-ray fluorescence spectroscopy. The depth removed is determined from the initial dimensions of the catalyst as well as its geometry and weight and the platinum group metal weight percentages are calculated as a function of distance from the exterior surface.

The maximum concentration of platinum is within 20 microns (i.e., at a depth of less than or equal to 20 microns) of the exterior surface of the support and the platinum concentration decreases with increasing penetration of the support at a rate so that at least about 70 percent of the total platinum is within 100 microns of the external surface. Preferably, at least about 90 percent of the total platinum is located within 100 microns of the external support and at least about 20 percent of the total platinum is located within 20 microns of the external surface of the support.

The concentration of rhodium is relatively high at or near the exterior surface of the support. The maximum rhodium concentration occurs within 20 microns of the exterior surface of the support. Generally, at least about 30 percent, preferably at least about 35 percent, of the total rhodium is within 20 microns of the external surface and at least about 40 percent, preferably at least about 50 percent, of the total rhodium is located at 20 to 100 microns from the external surface. Peferably, the catalyst has less than about 5 percent of the total rhodium located at more than 100 microns from the external surface of the support and at least about 20 percent of the total rhodium is located within 10 microns of the external surface of the support.

A substantial concentration of palladium is also present at or near the exterior surface of the support. Generally, at least about 10 percent of the palladium is located within 20 microns, from about 30 to about 60 percent of the palladium is located within 100 microns, and from about 70 to about 90 weight percent is located within 200 microns of the external surface of the support.

Catalysts prepared by the inclusion of a rhodium sulfito complex solution in the mixture are substantially more durable and thus this method is a highly preferred embodiment of this invention. These catalysts have at least about 20 percent of the total rhodium and a maximum rhodium concentration located within 10 microns of the external surface of the support, at least about 35 percent of the total rhodium located within 20 microns of the external surface of the support, and less than about 5 percent of the total rhodium located more than 100 microns from the external surface of the support.

The following examples illustrate the preparation and use of catalyst compositions prepared in accordance with this invention. All parts and percentages in the examples are by weight unless otherwise indicated.

EXAMPLE 1

Spheroidal alumina particles were calcined in air for 1 hour at 1030° C. and impregnated with a cerous nitrate solution to incipient wetness. The impregnated particles were dried in 135° C. air and calcined for 1 hour in air at about 750° C. The calcined particles contained 3 weight percent $CeO_2$ and had a compacted bulk density of 0.507 gram per cubic centimeter, a total pore volume of 0.86 cubic centimeter per gram, and a surface area of 110 square meters per gram.

An acid palladium sulfito complex solution was prepared by contacting at room temperature a palladium nitrate solution containing 1.000 gram of palladium with a sulfurous acid solution containing 2.71 grams of $SO_2$. The resulting solution was diluted to exactly 250 milliliters and contained 4 grams of palladium per liter of solution.

An acid platinum sulfito complex solution was prepared by contacting at room temperature a chloroplatinic acid solution containing 2.000 grams of platinum with a sulfurous acid solution containing 2.96 grams of $SO_2$ and heating the solution for 90 minutes in 60° C. water. After cooling to room temperature, the colorless solution was diluted to exactly 500 milliliters and contained 4 grams of platinum per liter of solution.

A rhodium nitrate solution containing 2 grams of rhodium per liter of solution was freshly prepared by diluting a concentrated rhodium nitrate solution.

The pH of a portion of the acid platinum sulfito complex solution was adjusted to 1.23 with concentrated ammonium hydroxide solution. A portion of the rhodium nitrate solution containing 17.8 milligrams of rhodium and then a portion of the palladium sulfito complex solution containing 71.2 milligrams of palladium and 102 milligrams of dibasic ammonium citrate were added to the acid platinum sulfito complex solution. The resulting mixture was diluted to a total volume sufficient to impregnate 152.2 grams of the ceria-alumina particles to 95 percent incipient wetness and had a pH of 1.20 after dilution.

152.2 grams of the ceria-alumina particles were sprayed with a fine mist of the mixture, dried for 3 hours in 135° C. air, and then reduced for 1 hour in a flowing mixture of 5 volume percent hydrogen and 95 volume percent nitrogen at 400° C. The resulting catalyst contained 0.593, 0.237, and 0.0593 gram per liter respectively of platinum, palladium, and rhodium.

EXAMPLE 2

A catalyst was prepared in accordance with the procedure of Example 1 except that the amount of dibasic ammonium citrate was increased to 170 milligrams and the pH of the mixture was adjusted to 1.43 with concentrated ammonium hydroxide.

EXAMPLE 3

A partially sulfited palladium-containing solution was prepared by contacting at room temperature a palladium nitrate solution containing 1.000 gram of palladium with a sulfurous acid solution containing 1.81 grams of sulfur dioxide. The resulting solution was diluted to exactly 150 milliliters and contained 4 grams of palladium per liter of solution.

An acid rhodium sulfito complex solution was prepared by contacting at room temperature an aqueous solution of rhodium trichloride and hydrochloric acid containing 0.2000 gram of rhodium with a sulfurous acid solution containing 0.374 gram of sulfur dioxide and then heating the solution for 2 hours in 55° C. water. After cooling to room temperature, the solution was diluted to exactly 100 milliliters.

A portion of the acid platinum sulfito complex solution of Example 1 containing 177.9 milligrams of platinum was mixed with a portion of the rhodium nitrate solution of Example 1 containing 8.9 milligrams of rhodium and a portion of the above-prepared acid-rhodium sulfito complex solution containing 8.9 milligrams of rhodium. A portion of the above-prepared partially sulfited solution contained 71.2 milligrams of palladium and 170 milligrams of dibasic ammonium citrate was then added. The resulting mixture was diluted to a total volume sufficient to impregnate 152.2 grams of the ceria-alumina particles of Example 1 and its pH was adjusted to 1.46 with concentrated ammonium hydroxide. This mixture was then used to prepare a catalyst in accordance with the procedure of Example 1.

EXAMPLE 4

A catalyst was prepared in accordance with the procedure of Example 1 except that the partially-sulfited palladium containing solution of Example 3 was substituted for the acid palladium sulfito complex solution of Example 1 and the pH of the mixture was adjusted to 1.46.

The fresh three-way conversion efficiency of catalysts produced by the method of this invention was evaluated in a down-flow Vycor glass reactor with an internal diameter of 2.2 centimeters using the gaseous feed shown in Table 1, a sample of 8.5 milliliters, and a total gas hourly space velocity of 60,000.

TABLE I

| Gas | Volume % |
|---|---|
| $HC(C_3H_6/C_3H_8 = 3/1)$ | 0.040 |
| CO | 0.225–0.756 |
| $H_2$ | 0.075–0.252 |
| NO | 0.185 |
| $O_2$ | 0.245–0.725 |
| $CO_2$ | 14.5 |
| $H_2O$ | 10.0 |
| $N_2$ | Balance |

An auxiliary CO and $H_2$ feed and $O_2$ feed were alternately turned on and off for ½ second and the inlet gas temperature was 482° C. as measured 0.635 centimeters above the catalyst bed. In this test, conversion efficiencies (% conversion) were determined as a function of the stoichiometry ratio of the feed as shown in Table III.

After the fresh activity test, the catalysts were subjected to approximately 190 hours of accelerated aging that was nearly equivalent to 800 to 1000 hours of aging on a standing engine dynamometer. The conditions of accelerated aging are shown in Table II.

TABLE II

| Accelerated Aging Conditions | |
|---|---|
| Aging Temperature (Average Bed) | Cycled between 593° C. (2 hrs.) and 760° C. (0.4 hr.) |
| Average Gas Hourly Space Velocity | 36,700 |
| Fuel Feed Rate | 1.77 liters/liter catalyst/hr. |
| Fuel Composition | n-Hexane containing 0.10 g Pb/gal., 0.25 g P/gal., and 0.04 Wt. % S |

The fresh and aged activities of catalysts produced by the method of this invention are shown in Table III. All of these catalysts contained 0.899 grams of total platinum group metals per liter of catalyst in a Pt/Pd/Rh weight ratio of 10/4/1.

TABLE III

| | | Performance of Pt-Pd-Rh TWC's | | | | | | | |
|---|---|---|---|---|---|---|---|---|---|
| | | % Conversion | | | | | | | |
| Example | | $R^a = 0.5$ | | | $R = x$ | | $R = 1.5$ | | |
| Number | Fresh or Aged | HC | CO | NO | HC | CO/NO | HC | CO | NO |
| 1 | F | 90 | 58 | 93 | 96 | 85 | 93 | 95 | 53 |
| | A | 56 | 41 | 64 | 58 | 48 | 58 | 52 | 32 |
| 2 | F | 90 | 64 | 93 | 96 | 87 | 92 | 94 | 50 |
| | A | 57 | 35 | 56 | 59 | 40 | 58 | 44 | 31 |
| 3 | F | 92 | 61 | 94 | 96 | 86 | 91 | 92 | 51 |
| 4 | F | 94 | 71 | 94 | 97 | 87 | 93 | 93 | 49 |
| | A | 65 | 42 | 64 | 67 | 50 | 67 | 57 | 36 |

[a]Stoichiometry ratio of the feed as defined by $R = ([O_2] + 0.5 [NO]/[0.185 + 0.5 ([CO] + [H_2])]$. Thus, $R = 0.5$ and $1.5$ represent 50 volume percent $O_2$-deficient and 50 volume percent $O_2$-excess conditions, respectively.
$R = x$ represents the stoichiometry ratio where CO conversions vs. R and NO conversion vs. R curves cross-over each other, and usually is located near $R = 1.0$

What is claimed is:

1. A method of preparing a platinum group metal catalyst composition comprising impregnating a refractory inorganic oxide support with a mixture having a pH from about 1 to about 5, said mixture comprising a platinum sulfito complex solution, a palladium sulfito complex solution, and a rhodium nitrate solution, and activating the impregnated support.

2. The method of claim 1 in which the mixture further comprises a rhodium sulfito complex solution.

3. The method of claim 1 or 2 in which the mixture has a pH of from about 1 to about 4.

4. The method of claim 1 or 2 in which the mixture has a pH of from about 1.2 to 2.

5. The method of claim 1 or 2 in which the palladium sulfito complex solution is an acid complex in situ solution.

6. The method of claim 5 in which the palladium sulfito complex solution further comprises dibasic ammonium citrate.

7. The method of claim 1 or 2 in which the platinum sulfito complex solution is an acid complex in situ solution.

8. The method of claim 1 or 2 in which the platinum sulfito complex solution is an ammonium complex in situ solution.

9. The method of claim 1 or 2 in which the platinum sulfito complex contains from about 1 to about 4 sulfito groups per atom of platinum.

10. The method of claim 1 or 2 in which the support comprises shaped spheroidal alumina particles.

11. The method of claim 1 or 2 in which the support comprises shaped spheroidal ceria-alumina particles.

12. The method of claim 1 or 2 in which the platinum and palladium sulfito complexes are prepared by reacting a compound of platinum and a compound of palladium with a sulfiting agent in an amount of from about 1 to about 6 moles of $SO_2$ or $HSO_3^-$ per gram atom of platinum and of from about 1 to about 6 moles of $SO_2$ or $HSO_3^-$ per gram atom of palladium.

13. The method of claim 12 in which the platinum and palladium sulfito complexes are prepared by reacting a compound of platinum and a compound of palladium with a sulfiting agent in an amount of from about 3 to about 5 moles of $SO_2$ or $HSO_3^-$ per gram atom of platinum and of from about 3 to about 5 moles of $SO_2$ or $HSO_3^-$ per gram atom of palladium.

14. The method of claim 2 in which the amounts of rhodium nitrate solution and rhodium sulfito complex solution in the mixture are such that from about 30 to about 70 weight percent of the total rhodium in the mixture is provided by each solution.

15. The method of claim 2 in which the amounts of rhodium nitrate solution and rhodium sulfito complex solution in the mixture are such that from about 40 to about 60 weight percent of the total rhodium in the mixture is provided by each solution.

16. The method of claim 2 in which the rhodium sulfito complex solution is an acid complex in situ solution.

17. The method of claim 2 in which the rhodium sulfito complex contains from about 1 to about 3 sulfito groups per atom of rhodium.

18. The method of claim 2 in which the rhodium sulfito complex is prepared by reacting rhodium trichloride with sulfurous acid for about ½ to about 2 hours at about 40° to 80° C.

19. The method of claim 3 in which the rhodium sulfito complex is prepared by reacting rhodium trichloride with sulfurous acid for about 16 to about 24 hours at about 20° to about 30° C.

20. A method of preparing an automotive exhaust catalyst composition comprising impregnating shaped spheroidal ceria-alumina particles with a mixture of an in situ platinum sulfito complex solution, an in situ palladium sulfito complex solution, a rhodium nitrate solution, and an in situ rhodium sulfito complex solution, said mixture having a pH of from about 1.2 to about 2 and containing sufficient amounts of each rhodium-containing solution so that each rhodium-containing solution provides from about 40 to about 60 percent of the total rhodium in the mixture, and activating the impregnated support.

* * * * *